Nov. 13, 1923.                                                      1,474,112
                            W. F. GROENE
                    COMBINED CLUTCH AND BRAKE DEVICE
                          Filed June 9, 1920            2 Sheets-Sheet 1

Inventor
William F. Groene
By Walter F. Murray
Attorney

Nov. 13, 1923.
W. F. GROENE
1,474,112
COMBINED CLUTCH AND BRAKE DEVICE
Filed June 9, 1920      2 Sheets-Sheet 2
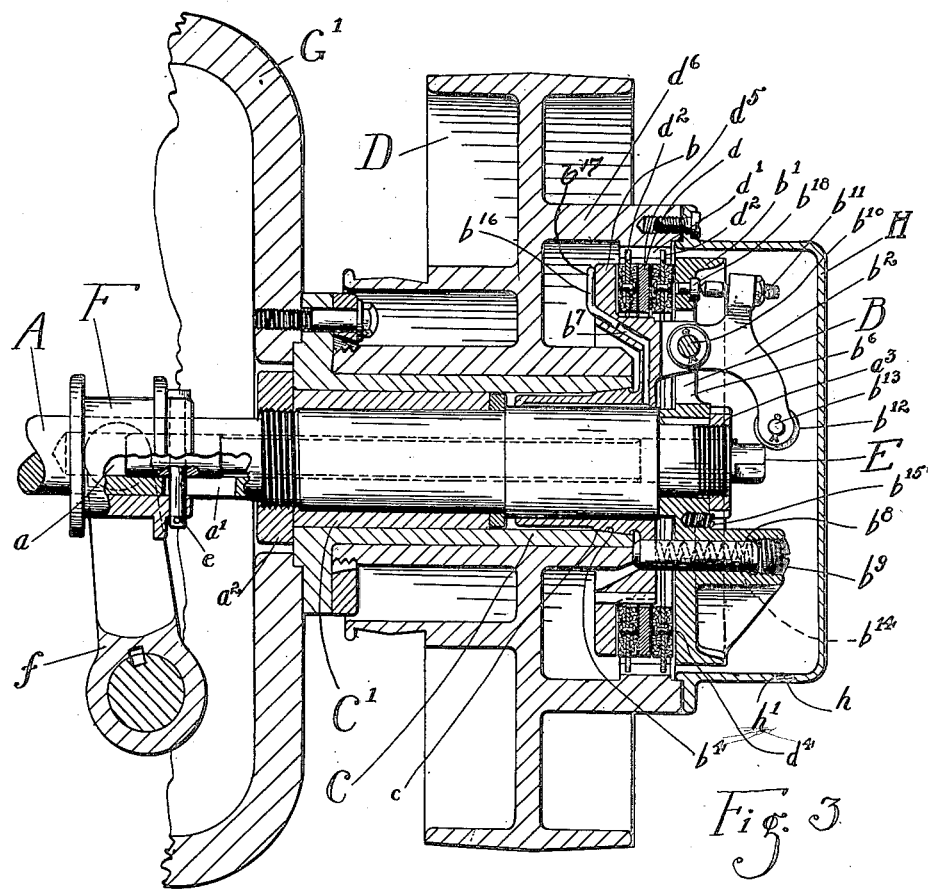
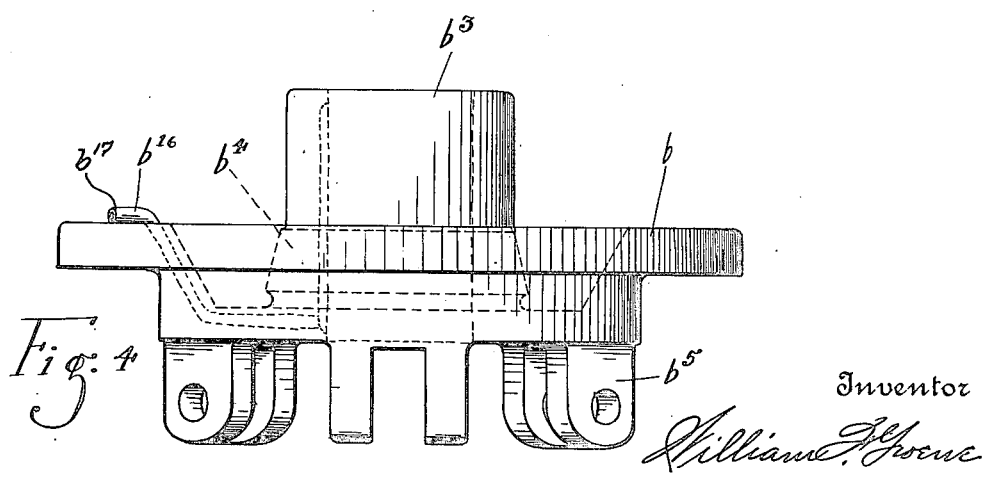
Inventor
William F. Groene
By Walter F. Murray
Attorney Patented Nov. 13, 1923.

1,474,112

UNITED STATES PATENT OFFICE.

WILLIAM F. GROENE, OF CINCINNATI, OHIO, ASSIGNOR, BY MESNE ASSIGNMENTS, TO THE R. K. LE BLOND MACHINE TOOL COMPANY, OF CINCINNATI, OHIO, A CORPORATION OF DELAWARE.

COMBINED CLUTCH AND BRAKE DEVICE.

Application filed June 9, 1920. Serial No. 387,748.

*To all whom it may concern:*

Be it known that I, WILLIAM F. GROENE, a citizen of the United States of America, and resident of Cincinnati, in the county of Hamilton and State of Ohio, have invented a new and useful Improvement in a Combined Clutch and Brake Device, of which the following is a specification.

An object of my invention is to provide a combined clutch and brake.

Another object is to provide a device wherein the operation of the clutch will immediately release the brake, and on disengagement of the clutch, the brake will be immediately operative.

Another object is to provide a simple and efficient device, for the purpose stated.

These and other objects are attained by the means described herein and disclosed in the accompanying drawing in which:

Fig. 3 is an enlarged sectional view on line 3—3 of Fig. 2.

Fig. 4 is an enlarged view of a friction collar forming a detail of my invention.

Figure 1:
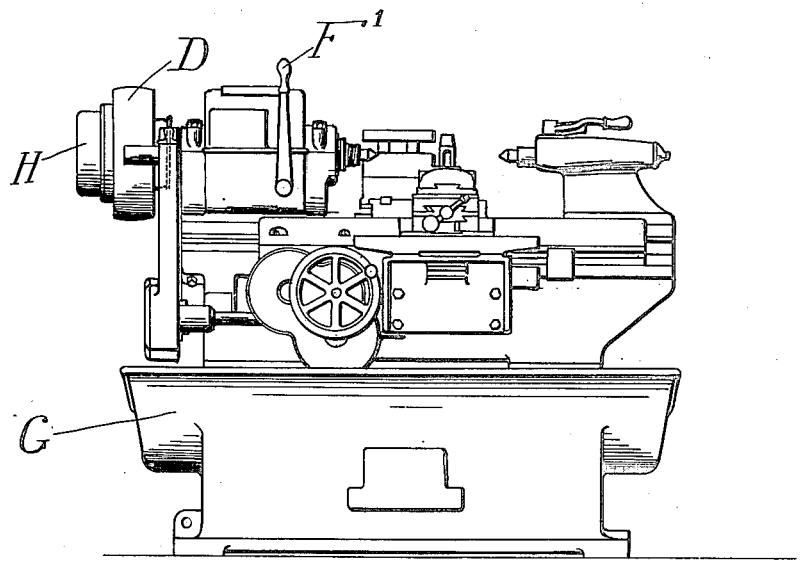
Fig. 1 is a front elevation of a lathe upon which a device embodying my invention is mounted.
Figure 2:
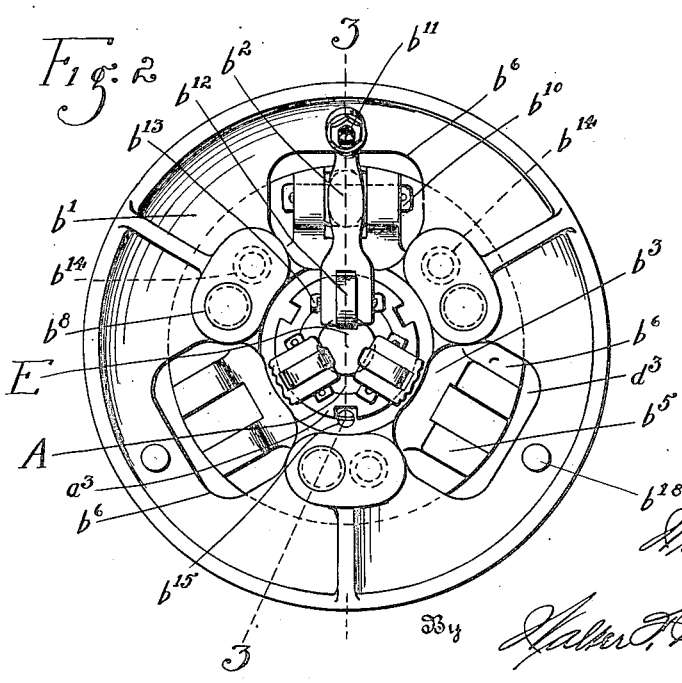
Fig. 2 is an enlarged end view of a clutch mechanism embodying my invention, the housing being removed.
Figure 5:
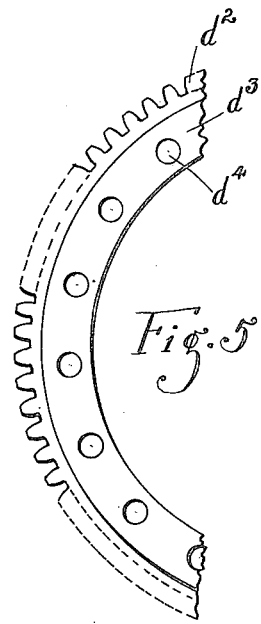
Fig. 5 is an enlarged view of a fragment of a toothed ring and friction disc forming details of my invention.

My invention comprises a driven shaft A upon the end of which is mounted a clutch device B adapted to clamp a drive pulley D mounted upon a brake sleeve C fixedly attached to the machine G and mounted concentrically upon the driven shaft A.

The driven shaft A has a central bore $a$ at its one end. A shift shaft E is mounted in the central bore $a$, and extends beyond the end of the shaft A. A slot $a'$ is formed in the driven shaft A. The pin $e$ secured to collar F, extends thru slot $a'$ and the shift shaft E. The shift shaft E is adapted to be longitudinally reciprocated by means of the collar F adapted to revolve with and mounted upon the driven shaft A, and to which the hand lever F' is attached by means of the yoke $f$. The brake sleeve C is spaced from the driven shaft by the sleeve $a^2$. A nut $a^3$ is adapted to screw upon the end of the shaft A and to secure the friction plate $b'$ to the shaft.

The clutch device B is mounted upon and keyed to the driven shaft A adjacent to the end of the driven shaft, and comprises the friction collar $b$, mounted upon the shaft A and adapted to be longitudinally reciprocated thereon, the friction plate $b'$ fixedly mounted upon the shaft A, and the lever arm $b^2$ pivotally attached to the friction collar $b$ and having its fulcrum upon the friction plate $b'$. The friction collar $b$ has a shank $b^3$ adapted to be inserted between the driven shaft and the brake sleeve C. A conical brake flange $b^4$ is formed upon the shank, and is adapted to engage a complementary conical surface $c$ upon the inside of the brake sleeve C. A series of lugs $b^5$ are formed on the friction collar and extend thru a series of slots $b^6$ in the friction plate $b'$. A duct $b^7$ is formed in the collar, and serves to convey a lubricant to the shaft A. A scoop pipe or tube $b^{16}$ is mounted in the duct and has its outer end $b^{17}$ pointing in the direction opposite to the rotation of the friction collar, thereby forcing oil thru the duct $b^7$. The friction plate $b'$ is fixedly attached to the driven shaft A, by means of the nut $a^3$ mounted upon the shaft A. A series of pins $b^8$ secured in the friction plate by the screws $b^9$, pass thru the friction collar $b$ and engage the brake sleeve C and abut the pulley D to secure it against end movement. The friction rings $d$ attached to the drive pulley D are disposed between the friction collar and the friction plate $b'$. The lever arm $b^2$ is pivotally mounted upon the lugs $b^5$ by means of the pivot $b^{10}$, and upon the friction plate $b'$ by means of the screw $b''$ which at its place of contact with the lever bearing $b^{18}$ mounted on the friction plate, operates as the fulcrum. A roller $b^{12}$ mounted on the arm $b^2$ by the pivot $b^{13}$, is adapted to be engaged by the shift shaft E. The springs $b^{14}$, seated in bores in the friction plate $b'$, normally push the friction collar and the friction plate from one another and hold the collar in frictional engagement with the brake sleeve. The set screw $b^{15}$ secures the nut $a^3$ to the friction plate.

The drive pulley is rotatively mounted upon the brake sleeve C attached to the casing G' of the machine tool G. The bushing C' is mounted between the brake sleeve and shaft A. An internal gear $d'$ is formed on the drive pulley. The friction rings $d$ comprise the toothed rings $d^2$ that engage the internal gear $d'$ and have secured to them the friction discs $d^3$ by means of the rivets $d^4$, and a resistance ring $d^5$ disposed loosely between the adjacent friction discs attached to the toothed rings. Any frictional material may be used for the discs.

A housing H is secured to the flange $d^6$ formed on the drive pulley D, together forming an oil chamber in which all the clutch mechanisms are contained. Oil is injected into the chamber thru the port $h$ that is normally closed by the screw $h'$.

The operation of my device is as follows:

The drive pulley D is revolving continuously, and the friction rings $d$ are being revolved therewith. Normally the spring $b^{14}$ holds the friction collar and friction plate apart so that neither engage any of the friction rings. When motion is to be imparted to the driven shaft A, the shift shaft is projected from the bore in the driven shaft A by means of the hand lever F'. The shift shaft engages the rollers $b^{12}$ on the lever arm and using the contact between screw $b''$ on the lever arm and the immovable lever bearing $b^{18}$ on the friction plate $b'$ as a fulcrum, the friction collar is moved toward the friction plate, thereby clamping the friction rings between the friction collar and the friction plate and imparting the motion of the pulley to the friction collar and to the friction plate. The pins $b^8$ secure the friction collar to the friction plate. The friction plate is fixedly attached to the shaft A, consequently the motion of the pulley is transmitted to the shaft A. Normally the conical flange upon the friction collar engages the conical surface $c$ on the brake sleeve C. When the collar is pulled toward the friction plate the conical flange is disengaged from the conical surface. When the hand lever is moved so as to release the clamping pressure of the friction collar and friction plate upon the friction rings, the springs $b^{14}$, the opposite ends of which abut the friction collar and friction plate, force the friction collar away from the friction plate and move the conical flange $b^4$ into engagement with the conical surface $c$ on the brake sleeve thereby forming an effective brake for the shaft A. The tendency of the friction rings to assume an unstrained position augments the force of the springs $b^{14}$ in moving the friction collar and friction plate apart.

The pins $b^8$ permit the longitudinal reciprocation of the friction collar upon the shaft and also bind the friction collar and friction plate together in such a way that they cannot rotate independently of one another.

Whilst I have described my invention as applied to lathes it is apparent that it is applicable to other kinds of machine tools.

What I claim is:

1. In a combined clutch and brake mechanism the combination with a driven shaft of a drive pulley mounted concentrically with the driven shaft, means to impart the motion of the pulley to the driven shaft and comprising a lug formed on the pulley, a series of friction rings engaging the lug, a friction plate and a friction collar mounted upon the driven shaft, means to relatively move the friction plate and friction collar from and into clamping engagement upon the friction rings, and means to check the driven shaft when the clamping engagement is broken.

2. In a combined clutch and brake mechanism the combination with a driven shaft of a drive pulley mounted concentrically with the driven shaft, friction rings mounted on the drive pulley, a friction collar and a friction plate on the driven shaft adapted to be clamped upon the friction rings, a brake sleeve mounted upon the driven shaft and fixedly secured to the machine to which the mechanism is applied, and means adapted to normally hold the friction collar in frictional engagement with the brake sleeve.

3. In a combined clutch and brake mechanism the combination with a driven shaft of a bushing on the driven shaft, a drive pulley mounted on the bushing on the driven shaft, means to impart motion to the driven shaft and comprising a lug formed on the pulley, a series of rings engaging the lug, friction discs mounted on each side of the toothed rings, a friction plate and a friction collar mounted upon the shaft, means to clamp the friction plate and friction collar upon the toothed rings, and the friction discs, means to release the clamping engagement of the friction plate and friction collar upon the rings and friction discs, a brake sleeve mounted upon the body of the machine to which the mechanism is applied and means to move the friction collar into frictional engagement with the brake sleeve.

4. In a combined clutch and brake mechanism the combination with a driven shaft, of a fixed brake sleeve mounted concentric to and spaced from the driven shaft, a drive pulley mounted upon the brake sleeve, a friction collar mounted on the driven shaft and extending between the driven shaft and the brake sleeve, means to normally hold the friction collar in engagement with the brake sleeve and means to release the friction collar from the brake and to move it into engagement with the drive pulley.

5. In a combined clutch and brake mechanism the combination with a driven shaft of a fixed brake sleeve mounted concentric with and spaced from the driven shaft, a drive pulley mounted on the brake sleeve, a series of friction rings attached to the pulley, a friction collar mounted on the driven shaft and extending between the driven shaft and the brake sleeve and being spaced on one side of the friction rings, a friction plate mounted on the driven shaft, and spaced on the opposite side of the friction rings, means to normally seat the friction collar against the brake sleeve, and means to release the friction collar from the brake sleeve and to relatively move the friction collar and friction plate into clamping relation upon the friction rings.

6. In a combined clutch and brake mechanism the combination with a driven shaft of a fixed brake sleeve mounted concentric with and spaced from the driven shaft, a drive pulley mounted on the brake sleeve, a series of friction rings attached to the pulley, a slotted friction collar mounted on the driven shaft and extending between the driven shaft and the brake sleeve and being spaced on one side of the friction rings, a slotted friction plate mounted on the driven shaft and having bores extending substantially in parallelism with the axis of the driven shaft, and spaced on the opposite side of the friction rings, pins mounted in certain of the bores in the friction plate extending thru the slots in the friction collar adapted to engage the pulley and the brake sleeve, springs mounted in other of the bores of the friction plate and having their opposite ends abutting upon the friction collar and friction plate, lugs on the friction collar extending into the slots into the friction plate, and levers pivotally mounted on the lugs and fulcrumed upon the friction plate.

7. In a combined clutch and brake mechanism the combination with a tube shaft of a fixed brake sleeve mounted concentric with and spaced from the tube shaft, a drive pulley mounted on the brake sleeve, a series of friction rings attached to the pulley, a slotted friction collar mounted on the tube shaft and extending between the tube shaft and the brake sleeve and being spaced on one side of the friction rings, a slotted friction plate mounted on the tube shaft and having bores extending substantially in parallelism with the axis of the tube shaft, and spaced on the opposite side of the friction rings, pins mounted in certain of the bores in the friction plate extending thru the slots in the friction collar adapted to engage the pulley and the brake sleeve, springs mounted in other of the bores of the friction plate and having their opposite ends abutting upon the friction collar and friction plate, lugs on the friction collar extending into the slots into the friction plate, levers pivotally mounted on the lugs and fulcrumed upon the friction plate, and a shift shaft reciprocally contained within the tube shaft engaging the lever and adapted to actuate the lever upon its fulcrum.

8. In a device of the class described the combination of a tube shaft, a bushing on the shaft in which bushing the shaft may be rotated, the bushing having a conical bore at its one end, a pulley rotatably mounted on the bushing, a friction plate fixedly mounted on the shaft, a reciprocating friction collar mounted to rotate with the shaft, capable of movement longitudinally of the shaft and having a conical brake flange for engagement on the conical face on the bushing, friction rings attached to the pulley, disposed between the friction collar and friction plate, capable of movement longitudinally of the shaft, a lever pivotally mounted on the friction collar having a fulcrum on the friction plate, and a shift shaft reciprocally contained in the bore in the tube shaft for actuating the lever about its pivotal mounting.

9. In a device of the class described the combination of a tube shaft, a bushing on the shaft in which bushing the shaft may be rotated, the bushing having a conical bore at its one end, a pulley rotatably mounted on the bushing, a friction plate fixedly mounted on the shaft, a reciprocating friction collar mounted to rotate with the shaft, capable of movement longitudinally of the shaft and having a conical brake flange for engagement on the conical face on the bushing, friction rings attached to the pulley, disposed between the friction collar and friction plate, capable of movement longitudinally of the shaft, a lever pivotally mounted on the friction collar having a fulcrum on the friction plate, and a spring abutting the friction plate and friction collar, yieldingly resisting movement of the collar toward the plate and normally retaining the conical faces in engagement upon one another.

10. In a device of the class described the combination of a tube shaft, a bushing on the shaft in which bushing the shaft may be rotated, the bushing having a conical bore at its one end, a pulley rotatably mounted on the bushing, a friction plate fixedly mounted on the shaft, a reciprocating friction collar mounted to rotate with the shaft, capable of movement longitudinally of the shaft and having a conical brake flange for engagement on the conical face on the bushing, friction rings attached to the pulley, disposed between the friction collar and friction plate, capable of movement longitudinally of the shaft, a lever pivotally mounted on the friction collar having a fulcrum on the friction plate, and means carried by the friction plate for precluding displacement of the pulley longitudinally of the bushing.

In witness whereof, I have hereunto subscribed my name this 3rd day of June, 1920.

WILLIAM F. GROENE.